US012624409B2

(12) United States Patent
Song et al.

(10) Patent No.: US 12,624,409 B2
(45) Date of Patent: May 12, 2026

(54) STEEL FOR HIGH-STRENGTH ALUMINUM CLAD SUBSTRATE AND MANUFACTURING METHOD THEREFOR

(71) Applicant: BAOSHAN IRON & STEEL CO., LTD., Shanghai (CN)

(72) Inventors: Fengming Song, Shanghai (CN); Wei Wang, Shanghai (CN); Xiaoping Hu, Shanghai (CN); Donghui Wen, Shanghai (CN); Yunhua Liu, Shanghai (CN); Junkai Wang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 826 days.

(21) Appl. No.: 17/414,555

(22) PCT Filed: Dec. 24, 2019

(86) PCT No.: PCT/CN2019/128006
§ 371 (c)(1),
(2) Date: Jun. 16, 2021

(87) PCT Pub. No.: WO2020/135438
PCT Pub. Date: Jul. 2, 2020

(65) Prior Publication Data
US 2022/0042134 A1      Feb. 10, 2022

(30) Foreign Application Priority Data

Dec. 24, 2018    (CN) .......................... 201811580436.7

(51) Int. Cl.
| | |
|---|---|
| *C22C 38/00* | (2006.01) |
| *B32B 15/01* | (2006.01) |
| *C21D 6/00* | (2006.01) |
| *C21D 8/02* | (2026.01) |
| *C21D 9/46* | (2006.01) |
| *C22C 38/02* | (2006.01) |
| *C22C 38/04* | (2006.01) |
| *C22C 38/06* | (2006.01) |
| *C22C 38/14* | (2006.01) |

(52) U.S. Cl.
CPC .............. *C21D 9/46* (2013.01); *C21D 6/005* (2013.01); *C21D 6/008* (2013.01); *C21D 8/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *B32B 15/012* (2013.01); *C21D 2211/005* (2013.01)

(58) Field of Classification Search
CPC ..................................................... C22C 38/04
See application file for complete search history.

(56) References Cited

U.S. PATENT DOCUMENTS 10,184,159 B2      1/2019  Holleck et al.

FOREIGN PATENT DOCUMENTS

| | | |
|---|---|---|
| CN | 105385944 A | 3/2016 |
| CN | 107881422 A | 4/2018 |
| CN | 108796384 A | 11/2018 |
| JP | 2009280847 A  * | 12/2009 |
| KR | 20120137931 A | 12/2012 |

OTHER PUBLICATIONS

English machine translation of JP 2009-280847 A retrieved on Jan. 13, 2024 (Year: 2009).*
Ratvik, Arne P.. (2017). Light Metals 2017—102.1 Introduction. "Twin-Roll Casting of Aluminum-Steel Clad Strips: Static and Dynamic Mechanical Properties of the Composite" (pp. 843). Springer Nature. (Year: 2017).*
International Search Report mailed on Mar. 17, 2020 for PCT Patent Application No. PCT/CN2019/128006.
Written Opinion mailed on Mar. 17, 2020 for PCT Patent Application No. PCT/CN2019/128006.

* cited by examiner

*Primary Examiner* — Keith D. Hendricks
*Assistant Examiner* — Joshua S Carpenter
(74) *Attorney, Agent, or Firm* — Lei Fang, Esq.; Smith Tempel Blaha LLC

(57) ABSTRACT

A steel for high-strength aluminum clad substrate, comprising the following chemical elements by mass percent: C: 0.008-0.02%, 0<Si≤0.005%, Mn: 0.25-0.5%, P: 0.018-0.03%, Al≤0.005%, N: 0.0040-0.010%, Ti: 0.02-0.04%, O: 0.02-0.050%, and the balance being Fe and other inevitable impurities. The manufacturing method therefor comprises the steps of: (1) smelting and casting; (2) reheating: reheating a casting blank to 1180° C.-1250° C.; (3) rough rolling; (4) finish rolling; (5) coiling; and (6) cooling to room temperature. The steel for high-strength aluminum clad substrate has good strength and good plasticity.

10 Claims, 1 Drawing Sheet

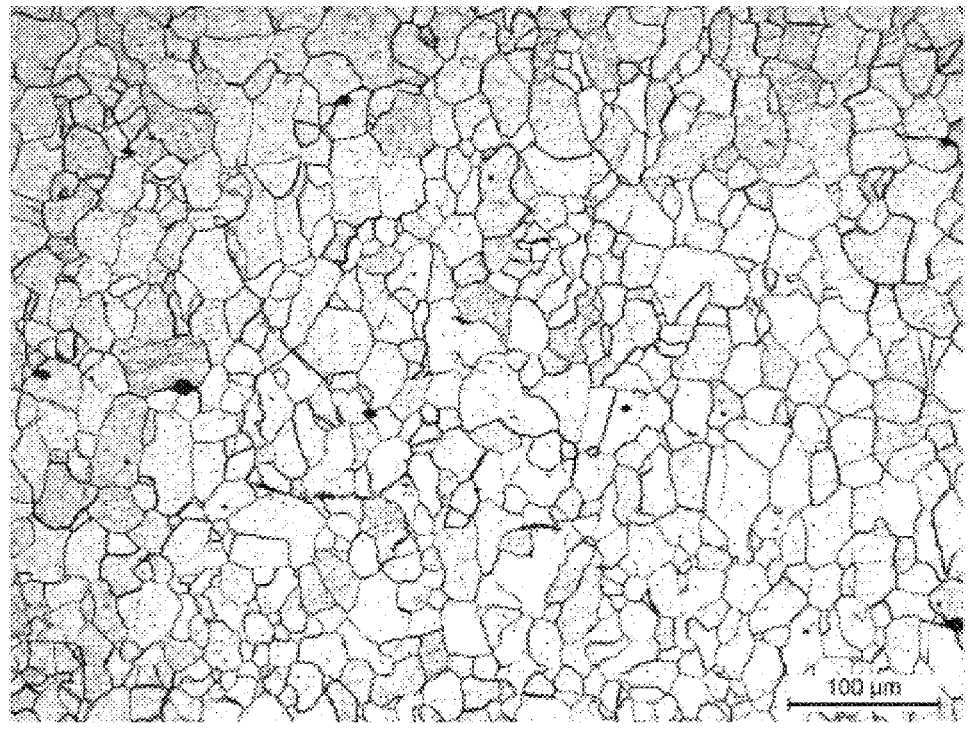

STEEL FOR HIGH-STRENGTH ALUMINUM CLAD SUBSTRATE AND MANUFACTURING METHOD THEREFOR

CROSS-REFERENCE TO RELATED APPLICATIONS

This application is a 371 U.S. National Phase of PCT International Application No. PCT/CN2019/128006 filed on Dec. 24, 2019, which claims priority to a Chinese Application No. 201811580436.7, filed on Dec. 24, 2018, the contents of both are incorporated by reference herein in their entireties.

TECHNICAL FIELD

The present invention relates to steel and a manufacturing method therefor, and particularly relates to steel for a substrate and a manufacturing method for the steel.

BACKGROUND OF THE INVENTION

With the development of technology and economy, the requirements on the property of a metal material are getting higher and higher, and it is often difficult for a single-composition metal material to simultaneously meet the requirements on various properties in an actual use process. A composite board made of two or more metal materials by various different processes can meet a special comprehensive property requirement. Aluminum clad steel is a composite sheet strip having an aluminum surface and a steel sandwich layer and formed by cladding the surface of strip steel with an aluminum film through rolling under a room temperature condition. It has the strength of steel, and also has the characteristics of good heat dissipating performance, erosion resistance, lightweight and aesthetics of aluminum. Particularly, the cost is greatly reduced. The aluminum clad steel is widely applied to the fields of household appliance panels, heat dissipating components, decoration and the like.

A substrate for producing aluminum clad strip steel deforms together with the aluminum film on the surface in the production process of the composite strip, so that the substrate is required to have equivalent strength and plasticity to aluminum. Therefore, the substrate is generally low in strength and good in plasticity. However, the aluminum clad substrate is also required to have good steel-aluminum cladding property, and it is difficult for steel with low yield strength in the usual sense to produce aluminum clad steel.

The Chinese patent document with the publication number CN102019727A and the publication date of Apr. 20, 2011 and entitled "Aluminum Clad Strip Steel for Cooler and Preparation Method Therefor, and Strip Steel and Aluminum Alloy Strip Used in Method" discloses aluminum clad strip steel and a preparation method therefor, and strip steel and an aluminum alloy strip used in the preparation method. In the technical solution disclosed in the Chinese patent document, although the substrate used is involved, it is mainly used to produce thicker aluminum clad strip steel, has low plastic deformation capacity, and is difficult to meet a large deformation requirement.

The Chinese patent document with the publication number CN101525720 and the publication date of Sep. 9, 2009 and entitled "Novel Matrix Strip Steel Special for Preparing Aluminum Clad Strip Steel" discloses novel matrix strip steel special for preparing aluminum clad strip steel. In the technical solution disclosed in the Chinese patent document, the steel involved is a high alloy composition in which the Mn content is 15-30%.

The Chinese patent document with the publication number CN107881427A and the publication date of Apr. 6, 2018 and entitled "Aluminum Clad Substrate with Excellent Plasticity and Low Yield Strength" discloses an aluminum clad substrate with low yield strength. It is required that the content of P must be controlled at 0.01% in order to guarantee the steel-aluminum bonding property and other mechanical property indicators. This obviously increases the production difficulty of a steel plate.

It can be seen from this that, on the one hand, the steel grades involved in the prior art do not have the steel-aluminum bonding property, and only have strength and plasticity that are equivalent to those of Al; on the other hand, the prior art that involves an aluminum clad substrate generally limits the content of P, which greatly increases the production difficulty of an aluminum clad substrate.

SUMMARY OF THE INVENTION

One objective of the present invention is to provide steel for a high-strength aluminum clad substrate. The steel for a high-strength aluminum clad substrate uses extremely low C and Si compositions, so that P does not need to be regarded as impurities to be controlled below 0.015%; the restriction to the content of P is relaxed, thereby significantly lowering the production difficulty and improving the production efficiency; and moreover, on the basis of guaranteeing the steel-aluminum bonding property, appropriate strength and good plasticity are achieved.

In order to achieve the above-mentioned objective, the present invention provides steel for a high-strength aluminum clad substrate, comprising chemical elements by mass percent: C: 0.008-0.02%, $0<Si\le0.005\%$, Mn: 0.25-0.5%, P: 0.018-0.03%, $Al\le0.005\%$, N: 0.0040-0.010%, Ti: 0.02-0.04%, O: 0.02-0.050%, and the balance being Fe and other inevitable impurities.

In the steel for a high-strength aluminum clad substrate of the present invention, a low C—Si—Mn design with a composition similar to pure iron is adopted, and an appropriate amount of P and Ti are added. Since aluminum clad steel has extremely strict control on compositions of steel, especially in order to ensure good steel-aluminum interface bonding property, the adding amounts of certain alloy components must be restricted, and there are also clear control requirements on conventional alloy components. These are significantly different from ordinary steel grades. Therefore, through a large number of experimental research and analysis, the inventors of this application have designed the mass percents of the above-mentioned chemical elements, and the design principle of all the chemical elements is as follows:

C: In the steel for a high-strength aluminum clad substrate according to the present invention, C would increase the yield strength of a steel plate through solid solution strengthening and decrease the elongation. According to an actual steelmaking process, the content of C should be reduced as much as possible. Therefore, in the steel for a high-strength aluminum clad substrate of the present invention, the mass percent of C is controlled within 0.008-0.02%. Preferably, the mass percent of C is 0.008-0.015%.

Si: In the technical solution of the present invention, Si is a deoxidizing element and also a solid solution strengthening element. For the technical solution of the present invention, adding Si can increase the yield strength of the steel plate and reduce the elongation, and Si exceeding the upper limit of the content of this application will deteriorate the steel-aluminum interface bonding property. Therefore, the mass percent of Si in the steel for the high-strength aluminum clad substrate of the present invention is controlled to be $0 < Si \leq 0.005\%$.

Mn: Mn is an essential element for steelmaking deoxidation, and can expand the austenite zone, reduce an undercooled austenite transformation temperature, promote the transformation of low and medium-temperature structures, and refine the microstructure of the steel. Therefore, Mn is an important strengthening and toughening element. However, for the steel grade involved in the present invention, adding Mn that exceeds the upper limit of content will cause segregation of the steel grade, deteriorate a matrix structure and form larger MnS inclusions, thereby deteriorating the weldability of the steel plate and the toughness of a welding heat-affected zone. In addition, for the technical solution of the present invention, adding too much Mn also increases the cost accordingly. Therefore, in the steel for the high-strength aluminum clad substrate of the present invention, the mass percent of Mn is controlled at 0.25-0.5%.

P: P is likely to segregate at a grain boundary, which reduces the bonding energy of the grain boundary, and embrittles the steel plate. Adding P into free-cutting steel can prevent debris from sticking to a tool, thereby prolonging the service life of the tool. For the steel grade system of this technical solution, since P and N belong to the fifth group in the periodic table of elements, the inventors found that P has attributes similar to N. In the steel involved in this technical solution, it can suppress the diffusion of Al, in particular, plays a role in making it difficult to form a brittle steel-aluminum compound layer at a steel-aluminum interface. Therefore, the steel-aluminum bonding property is significantly improved, which plays an important role in achieving the technical effects of this application. However, on the other hand, in this technical solution, P exceeding the upper limit of content is detrimental to the toughness and the elongation of the steel grade of the present invention. Therefore, in the steel for the high-strength aluminum clad substrate of the present invention, the mass percent of P is controlled at 0.018-0.03%. Preferably, the mass percent of P can be further controlled at 0.018-0.024%.

Al: Al is a deoxidizing element and can also increase the strength of the steel. However, Al at a higher content easily diffuses to the steel-aluminum bonding interface to deteriorate the interface bonding strength. Therefore, in the technical solution of the present invention, Al is used as a harmful element and the mass percent of Al is controlled to avoid the influence on the steel-aluminum bonding property. In the steel for the high-strength aluminum clad substrate of the present invention, the mass percent of Al is controlled at $Al \leq 0.005\%$.

N: In the steel for the high-strength aluminum clad substrate of the present invention, N can form AlN particles with Al in the steel, thereby inhibiting the diffusion of Al to the interface, but a higher solid solution content of N can significantly increase the strength of the steel and is detrimental to the plasticity of the steel. Therefore, in the steel for the high-strength aluminum clad substrate of the present invention, the mass percent of N is controlled within 0.0040-0.01%. Preferably, the mass percent of N can be further controlled within 0.004-0.008%. Moreover, in some preferred implementation modes, the mass percents of Ti, N, and C can be further restricted to satisfy $Ti/(3.42N+4C) \geq 0.3$, which is to ensure that there is enough Ti in the steel to be bonded with C and N in the steel, so as to fix C and N and play a role in refining crystal grains and avoiding the formation of AlN. The upper limit of $Ti/(3.42N+4C)$ is 0.88.

Ti: Ti is a strong ferrite-forming element and a carbonitride-forming element. For the steel grade involved in the present invention, an appropriate amount of nitrogen and titanium form titanium nitride at a formation temperature of above 1400° C., and the titanium nitride precipitates in a high temperature liquid phase or $\delta$ ferrite. $Ti_4C_2S_2$ begins to precipitate at 1260° C., and TiC precipitates at 1050° C. The above-mentioned tiny precipitates can pin the grain boundary to refine austenite grains and prevent the grains in the welding heat-affected zone from growing, thereby improving the welding property of the steel plate of the steel grade involved in the present invention. In addition, for the technical solution of the present invention, Ti can be preferentially bonded with N in this application, thereby reducing the amount of AlN in the steel and improving the plasticity and the toughness of the steel grade involved in the present invention. However, Ti exceeding the upper limit of content of this application will coarsen the particles such as TiC and TiN, thereby losing the grain boundary pinning effect, increasing the grain size, reducing the grain boundary strengthening effect, and reducing the elongation of the steel grade. Therefore, the mass percent of Ti in the steel for the high-strength aluminum clad substrate of the present invention is restricted to 0.02-0.04%. Moreover, in some preferred implementation modes, the mass percents of Ti, N, and C can be further restricted to satisfy $Ti/(3.42N+4C) \geq 0.3$.

O: In the steel for the high-strength aluminum clad substrate of the present invention, since the contents of Si and Al in the technical solution of the present invention are restricted within an extremely low range, the content of oxygen in the steel is inevitably increased. However, the oxygen element can inhibit the adverse effect of the Al element in the steel on the steel-aluminum interface bonding, but at the same time, the oxygen at the excessively high content is easily formed into non-metallic inclusions, which is detrimental to the fatigue property and the toughness of the steel plate. Therefore, in the steel of high-strength aluminum clad substrate of the present invention, the mass percent of O is restricted to 0.02-0.050%, preferably to 0.02-0.04%. In addition, in some preferred implementation modes, the mass percents of O, Al, and Si can be further restricted to satisfy $O/(0.9Al+1.2Si) \geq 3.0$, so that O is still enough after being bonded with the remaining Si and Al in the steel to guarantee the steel-aluminum bonding property. Preferably, $3.0 \leq O/(0.9Al+1.2Si) \leq 10.0$.

In summary, it can be seen that compared with the prior art, the technical solution of the present invention significantly lowers the production difficulty, simplifies the production process and improves the production efficiency by cooperation of all chemical element compositions, particularly by adding P as a favorable element, thereby obtaining the steel for the high-strength aluminum clad substrate with excellent property in this application.

Further, the steel for the high-strength aluminum clad substrate of the present invention also satisfies at least one of Ti/(3.42N+4C)≥0.3 and O/(0.9Al+1.2Si)≥3.0.

It should be noted that Ti, N, C, O, Al, and Si in the above formula represent their respective mass percents, and the numerical values substituted into the above formula are numerical values in front of %. For example, the mass percent of Ti is 0.021%, the mass percent of N is 0.0068%, and the mass percent of C is 0.0082%, which are substituted into the above formula Ti/(3.42N+4C)=0.021/(3.42×0.0068+4×0.0082)=0.37.

Further, in the steel for the high-strength aluminum clad substrate of the present invention, the mass percents of all the chemical elements also satisfy at least one of the following items: C: 0.008-0.015%, P: 0.018-0.024%, N: 0.004-0.008%, O: 0.02-0.04%.

Further, in the steel for the high-strength aluminum clad substrate of the present invention, among the inevitable impurities, the mass percent of S is less than or equal to 0.005%. Exceeding this upper limit is detrimental to the plasticity and the toughness, and also causes welding pores and porosity defects.

Further, in the steel for the high-strength aluminum clad substrate of the present invention, a matrix of the steel is an equiaxed ferrite, the grain size of which is 10-50 microns.

Further, in the steel for the high-strength aluminum clad substrate of the present invention, the yield strength is 210-290 MPa, the tensile strength is greater than or equal to 320 MPa, and the elongation is greater than or equal to 40%. This property parameter is tested according to "GB/T 228.1-2010 Metallic Material Tensile Test Part 1: Room-Temperature Tensile Test Method". The upper limit of the tensile strength is about 420 MPa, and the upper limit of the elongation is about 60%.

Correspondingly, another objective of the present invention is to provide a manufacturing method for the above-mentioned steel for a high-strength aluminum clad substrate. The manufacturing method adopts high-temperature hot rolling, so that the production process is simple, and the production cost is lower; and the obtained steel for the high-strength aluminum clad substrate is excellent in plasticity and steel-aluminum cladding property.

In order to achieve the above-mentioned objectives, the present invention provides a manufacturing method for the above-mentioned steel for the high-strength aluminum clad substrate, comprising the following steps:

(1) smelting and casting;
(2) reheating: reheating a casting blank to 1180° C.-1250° C.;
(3) rough rolling;
(4) finish rolling;
(5) coiling; and
(6) cooling to room temperature.

In the manufacturing method of the present invention, under the comprehensive consideration of the solid solution effect of alloying elements in the casting blank of this application, this application controls the casting blank to be reheated at 1180° C.-1250° C.; Then, rough rolling, finish rolling, coiling and cooling are performed to obtain a desired steel plate. Since the steel for the high-strength aluminum clad substrate in this application is ultra-low carbon steel, and the adding amount of alloying elements is small, the matrix is a typical equiaxed ferrite structure, the grain size of which is 10-50 microns.

Further, in the manufacturing method of the present invention, at the step (3), the cumulative deformation in the rough rolling stage is greater than or equal to 80%, and the temperature at the end of rough rolling is 950° C. to 1150° C.

Further, in the manufacturing method of the present invention, at the step (4), the final rolling temperature of the finish rolling is controlled to be 840-920° C.

Further, in the manufacturing method of the present invention, at the step (5), the steel plate after finish rolling is water-cooled to 580-640° C. for coiling.

Compared with the prior art, the steel for the high-strength aluminum clad substrate and the manufacturing method therefor according to the present invention have the following advantages and beneficial effects: the steel for the high-strength aluminum clad substrate of the present invention has excellent comprehensive mechanical properties, with yield strength of 210-290 MPa, tensile strength greater than or equal to 320 MPa, and elongation exceeding 40%.

In addition, the steel for the high-strength aluminum clad substrate of the present invention has excellent steel-aluminum interface bonding property. The thickness of a steel-aluminum interface compound layer after the aluminum clad steel for the high-strength aluminum clad substrate is subjected to final high-temperature brazing is less than or equal to 5 μm. In some preferred implementation modes, the thickness can even be zero. Therefore, the steel-aluminum interface of the steel for the high-strength aluminum clad substrate of the present invention is clean, which is very suitable for the production of aluminum clad strip steel.

Furthermore, the mass percent of P in the steel for the high-strength aluminum clad substrate of the present invention is enlarged to 0.018-0.03%, which lowers the production difficulty, simplifies the production process and improves the production efficiency.

In addition, the steel for the high-strength aluminum clad substrate of the present invention has excellent plastic deformation capability, and can meet a single-pass large deformation requirement in an aluminum cladding rolling process, without annealing during the process, thereby reducing production procedures and improving the production efficiency.

In addition to the above-mentioned advantages and beneficial effects, the manufacturing method of the present invention is simple in process and lower in cost due to the adoption of high-temperature hot rolling, thus being very suitable for large-scale production of aluminum clad strip steel by enterprises.

BRIEF DESCRIPTION OF THE DRAWINGS

FIG. 1 illustrates a microstructure of steel for a high-strength aluminum clad substrate of Embodiment 1.

DETAILED DESCRIPTION OF THE INVENTION

The steel for a high-strength aluminum clad substrate and a manufacturing method therefor of the present invention will be further explained and described below in combination with specific embodiments and the accompanying drawings of the description. However, the explanation and description do not improperly limit the technical solution of the present invention.

Embodiments 1-8

Table 1 lists the mass percents (wt %) of all chemical elements in steel for a high-strength aluminum clad substrate of Embodiments 1-8.

TABLE 1

| (wt %, the balance being Fe and other inevitable impurity elements in addition to S) | | | | | | | | | | |
|---|---|---|---|---|---|---|---|---|---|---|
| Serial number | C | Si | Mn | P | S | Al | Ti | O | N | Ti/ (3.42N + 4C) | O/ (0.9 Al + 1.2 Si) |
| Embodiment 1 | 0.0082 | 0.003 | 0.26 | 0.018 | 0.0031 | 0.0032 | 0.021 | 0.0307 | 0.0068 | 0.37 | 4.74 |
| Embodiment 2 | 0.013 | 0.0037 | 0.25 | 0.024 | 0.0027 | 0.0011 | 0.0282 | 0.0423 | 0.0048 | 0.41 | 7.79 |
| Embodiment 3 | 0.0148 | 0.0015 | 0.37 | 0.026 | 0.0019 | 0.0045 | 0.034 | 0.0283 | 0.0088 | 0.38 | 4.84 |
| Embodiment 4 | 0.0122 | 0.005 | 0.33 | 0.019 | 0.0038 | 0.0012 | 0.032 | 0.0219 | 0.0065 | 0.45 | 3.09 |
| Embodiment 5 | 0.0097 | 0.0046 | 0.28 | 0.028 | 0.0029 | 0.0011 | 0.024 | 0.0268 | 0.0072 | 0.38 | 4.12 |
| Embodiment 6 | 0.017 | 0.0034 | 0.44 | 0.029 | 0.0045 | 0.0042 | 0.036 | 0.048 | 0.0061 | 0.41 | 6.11 |
| Embodiment 7 | 0.013 | 0.0012 | 0.42 | 0.021 | 0.0047 | 0.0028 | 0.039 | 0.0235 | 0.0077 | 0.5 | 5.93 |
| Embodiment 8 | 0.018 | 0.005 | 0.48 | 0.023 | 0.0033 | 0.0012 | 0.033 | 0.0407 | 0.0098 | 0.31 | 5.75 |

It can be seen from Table 1 that compared with the prior art, the mass percents of Si and Al of all the embodiments of this application are all less than 0.005%; the mass percent of O is within 0.02-0.05%; and the mass percent of N is 0.0040-0.010%. In addition, in this application, P is added as a favorable element, so that the mass percent of P is controlled at 0.018-0.03%.

A manufacturing method for the steel for a high-strength aluminum clad substrate of Embodiments 1-8 adopts the following steps:

(1) Smelting and casting: smelting chemical element compositions shown in Table 1 in a 500 kg vacuum induction furnace, and casting to obtain a casting blank.

(2) Reheating: reheating the casting blank to 1180° C.-1250° C.

(3) Rough rolling: wherein the cumulative deformation in the rough rolling stage is greater than or equal to 80%, and the temperature at the end of rough rolling is 950° C. to 1150° C.

(4) Finish rolling: controlling a final rolling temperature of the finish rolling to be 840-920° C.

(5) Coiling: water-cooling the steel plate after finish rolling to 580-640° C. for coiling.

(6) Cooling to room temperature.

It should be noted that at the step (5), a cooling mode for coiling can also be air cooling in addition to water cooling. For example, when the steel for the high-strength aluminum clad substrate is thinner, such as ≤3.0 mm, air cooling can also cause the steel for the high-strength aluminum clad substrate to be cooled to a desired coiling temperature before entering a coiling machine, and the property meets the requirements.

Table 2 lists specific process parameters involved in the manufacturing method for the steel for the high-strength aluminum clad substrate of Embodiments 1-8.

TABLE 2

| | | Step (3) | | Step (4) | Step (5) |
|---|---|---|---|---|---|
| Serial number | Step (2) Heating temperature (° C.) | Accumulative deformation (%) | Temperature at end of rough rolling (° C.) | Final rolling temperature (° C.) | Coiling temperature (° C.) |
| Embodiment 1 | 1180 | 85.4 | 980 | 876 | 589 |
| Embodiment 2 | 1202 | 84.2 | 984 | 888 | 590 |
| Embodiment 3 | 1195 | 83.4 | 960 | 905 | 583 |
| Embodiment 4 | 1211 | 83.2 | 1020 | 912 | 630 |
| Embodiment 5 | 1250 | 82.6 | 1021 | 914 | 624 |
| Embodiment 6 | 1220 | 82.2 | 1025 | 910 | 618 |
| Embodiment 7 | 1209 | 82.0 | 1032 | 908 | 620 |
| Embodiment 8 | 1198 | 81.6 | 1040 | 900 | 622 |

Various tests are performed on the steel for the high-strength aluminum clad substrate of Embodiments 1-8. Test results are listed in Table 3.

TABLE 3

| Serial number | Plate thick-ness | Rp 0.2 (MPa) | Rm (MPa) | A50 (%) | Micro-structure of matrix | Thickness (μm) of steel-aluminum interface compound layer of aluminum clad steel for substrate |
|---|---|---|---|---|---|---|
| Embod-iment 1 | 2 mm | 274 | 355 | 41 | Equiaxed ferrite, the grain size of which is 10-50 microns | Interface is clean, and no compound layer is formed |
| Embod-iment 2 | 2.4 mm | 243 | 360 | 50 | Equiaxed ferrite, the grain size of which is 10-50 microns | Interface is clean, and no compound layer is formed |
| Embod-iment 3 | 2.8 mm | 227 | 344 | 48 | Equiaxed ferrite, the grain size of which is 10-50 microns | Interface is clean, and no compound layer is formed |
| Embod-iment 4 | 3 mm | 248 | 334 | 52 | Equiaxed ferrite, the grain size of which is 10-50 microns | Interface is clean, and no compound layer is formed |
| Embod-iment 5 | 3.5 mm | 225 | 360 | 43 | Equiaxed ferrite, the grain size of which is 10-50 microns | A small amount of discontinuous compound layer, the maximum thickness of which is 2.2 μm |
| Embod-iment 6 | 4 mm | 241 | 342 | 44 | Equiaxed ferrite, the grain size of which is 10-50 microns | A small amount of discontinuous compound layer, the maximum thickness of which is 4 μm |
| Embod-iment 7 | 6 mm | 268 | 338 | 44 | Equiaxed ferrite, the grain size of which is 10-50 microns | A small amount of discontinuous compound layer, the maximum thickness of which is 3.2 μm |
| Embod-iment 8 | 8 mm | 221 | 324 | 46 | Equiaxed ferrite, the grain size of which is 10-50 microns | Interface is clean, and no compound layer is formed |

It can be seen from Table 3 that the steel for the high-strength aluminum clad substrate of each embodiment of this application has stable yield strength. Under different rolling processes, steel plates of various specifications have yield strength of 210-290 MPa and tensile strength greater than or equal to 320 MPa and have extremely high elongation (the elongation is greater than or equal to 40%).

In addition, it can also be seen from Table 3 that the steel for the high-strength aluminum clad substrate of each embodiment of this application has excellent steel-aluminum interface bonding property, and the thickness of the steel-aluminum interface compound layer of the aluminum clad steel for the aluminum clad substrate is less than or equal to 5 μm. In some other preferred implementation modes, the thickness of the steel-aluminum interface compound layer can even be zero.

FIG. 1 illustrates a microstructure of steel for a high-strength aluminum clad substrate of Embodiment 1. As shown in FIG. 1, a matrix of the steel for the high-strength aluminum clad substrate of Embodiment 1 is an equiaxed ferrite, the grain size of which is 10-50 microns.

It can be seen from Table 1 to Table 3 and FIG. 1 that the steel for the high-strength aluminum clad substrate of each embodiment of this application adopts the extremely low C—Si—Mn design, supplemented by a small amount of Ti, N and O and appropriate P, so that the obtained steel for the high-strength aluminum clad substrate meets the requirements of high elongation, good steel-aluminum cladding property and high deformability of the aluminum clad substrate; and furthermore, the manufacturing method of this application has the advantages of short production period and simple process, and is very applicable to production of aluminum clad strip steel.

Compared with the prior art, the steel for the high-strength aluminum clad substrate and the manufacturing method therefor according to the present invention have the following advantages and beneficial effects: the steel for the high-strength aluminum clad substrate of the present invention has excellent comprehensive mechanical properties, with yield strength of 210-290 MPa, tensile strength greater than or equal to 320 MPa, and elongation exceeding 40%.

In addition, the steel for the high-strength aluminum clad substrate of the present invention has excellent steel-aluminum interface bonding property. The thickness of a steel-aluminum interface compound layer after the aluminum clad steel for the high-strength aluminum clad substrate is subjected to final high-temperature brazing is less than or equal to 5 μm. In some preferred implementation modes, the thickness can even be zero. Therefore, the steel-aluminum interface of the steel for the high-strength aluminum clad substrate of the present invention is clean, which is very suitable for the production of aluminum clad strip steel.

Furthermore, the mass percent of P in the steel for the high-strength aluminum clad substrate of the present invention is enlarged to 0.018-0.03%, which lowers the production difficulty, simplifies the production process and improves the production efficiency.

In addition, the steel for the high-strength aluminum clad substrate of the present invention has excellent plastic deformation capability, and can meet a single-pass large deformation requirement in an aluminum cladding rolling process, without annealing during the process, thereby reducing production procedures and improving the production efficiency.

In addition to the above-mentioned advantages and beneficial effects, the manufacturing method of the present invention is simple in process and lower in cost due to the adoption of high-temperature hot rolling, thus being very suitable for large-scale production of aluminum clad strip steel by enterprises.

It should be noted that the prior art part of the protection scope of the present invention is not limited to the embodiments provided in this application document, and all prior arts not contradicting the solution of the present invention, including but not limited to, the previous patent documents, prior publications, prior publications, etc., can be included in the protection scope of the present invention.

In addition, the combination of various technical features in this solution is not limited to the combination described in the claims of this application or the combination described in the specific embodiments. All technical features described herein can be freely combined or integrated in any way, unless contradictions arise between each other.

It should also be noted that the above-listed embodiments are only specific embodiments of the present invention. Obviously, the present invention is not limited to the above embodiments, and subsequently made similar changes or modifications can be directly derived from or easily associated with the disclosure of the present invention by those skilled in the art, and should all fall within the protection scope of the present invention.

We claim:

1. A steel plate, comprising a substrate and an aluminum layer covering the substrate, wherein the substrate comprises the following chemical elements by mass percent:

C: 0.008-0.02%, 0<Si<0.005%, Mn: 0.25-0.5%, P: 0.018-0.03%, Al≤0.005%, N: 0.0040-0.010%, Ti: 0.02-0.04%, O: 0.02-0.050%, and the balance being Fe and other inevitable impurities; wherein the mass percent of each of Ti, N, and C elements in the substrate satisfies Ti/(3.42N+4C)≥0.3, and the mass percent of each of O, Al, and Si elements satisfies O/(0.9Al+1.2Si)≥3.0;

wherein the substrate has a tensile strength of 320 MPa-420 MPa and an elongation greater than or equal to 40%; and wherein a steel-aluminum interface compound layer has a thickness≤5 μm.

2. The steel plate according to claim 1, wherein the substrate has the mass percent of each of Ti, N, and C elements satisfying 0.3≤Ti/(3.42N+4C)≤0.88, and the mass percent of each of O, Al, and Si elements satisfying 3.0≤O/(0.9Al+1.2Si)≤10.0.

3. The steel plate according to claim 1, wherein each C, P, N, and O of the substrate by mass percent is:

C: 0.008-0.015%, P: 0.018-0.024%, N: 0.004-0.008%, O: 0.02-0.04%.

4. The steel plate according to claim 1, wherein among the inevitable impurities, the mass percent of S of the substrate is less than or equal to 0.005%.

5. The steel plate according to claim 1, wherein a matrix of the substrate is an equiaxed ferrite, a grain size of which is 10-50 microns.

6. The steel plate according to claim 1, wherein the substrate has a yield strength of 210-290 MPa.

7. The steel plate of claim 2, wherein the substrate has a yield strength of 210-290 MPa.

8. The steel plate of claim 3, wherein the substrate has a yield strength of 210-290 MPa.

9. The steel plate of claim 4, wherein the substrate has a yield strength of 210-290 MPa.

10. The steel plate of claim 5, wherein the substrate has a yield strength of 210-290 MPa.

* * * * *